US012320258B2

(12) United States Patent
Rogers et al.

(10) Patent No.: US 12,320,258 B2
(45) Date of Patent: Jun. 3, 2025

(54) BLADE OUTER AIR SEAL WITH LARGE RADIUS OF CURVATURE MOUNT HOOKS

(71) Applicant: Raytheon Technologies Corporation, Farmington, CT (US)

(72) Inventors: Daniel S. Rogers, Lyman, ME (US); Joseph Micucci, Scarborough, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/990,244

(22) Filed: Nov. 18, 2022

(65) Prior Publication Data

US 2024/0167391 A1 May 23, 2024

(51) Int. Cl.
*F01D 11/08* (2006.01)

(52) U.S. Cl.
CPC .......... *F01D 11/08* (2013.01); *F05D 2220/32* (2013.01); *F05D 2240/55* (2013.01); *F05D 2300/2261* (2013.01); *F05D 2300/2283* (2013.01); *F05D 2300/6033* (2013.01)

(58) Field of Classification Search
CPC ................... F01D 11/08; F01D 11/005; F05D 2300/2261; F05D 2300/2283; F05D 2300/6033; F05D 2240/55; F04D 2240/11
See application file for complete search history.

(56) References Cited

U.S. PATENT DOCUMENTS

| | | | | |
|---|---|---|---|---|
| 4,596,116 | A * | 6/1986 | Mandet | F01D 11/08 60/785 |
| 6,113,349 | A * | 9/2000 | Bagepalli | F01D 11/08 415/173.1 |
| 6,315,519 | B1 * | 11/2001 | Bagepalli | F01D 25/246 415/138 |
| 6,702,550 | B2 | 3/2004 | Darkins, Jr. et al. | |
| 8,905,709 | B2 * | 12/2014 | Dziech | F01D 25/246 415/173.1 |
| 10,280,801 | B2 | 5/2019 | Hafner et al. | |
| 10,519,790 | B2 * | 12/2019 | Hafner | F01D 11/08 |
| 10,648,348 | B2 * | 5/2020 | Hafner | F23R 3/007 |

(Continued)

FOREIGN PATENT DOCUMENTS

EP 3106630 A1 12/2016

OTHER PUBLICATIONS

European Search Report for EP Application No. 23210947.0 dated Mar. 19, 2024.

*Primary Examiner* — Topaz L. Elliott
(74) *Attorney, Agent, or Firm* — Carlson, Gaskey & Olds, P.C.

(57) ABSTRACT

A blade outer air seal has seal mount hooks on both a leading edge of the central web and a trailing edge of the central web. The seal mount hooks have a generally radially outward extending section extending to a generally axially extending section. The seal mount hooks have a support face which is to be supported on a support mount hook. The support face is generally formed about a single radius of curvature over at least 50% of a circumferential length defined from a radially inner end of the support face to a radially outer end of the support face. A radius of curvature of the inner support surface is greater than or equal to 0.150 inch and less than or equal to 0.300 inch. A blade outer air seal and a gas turbine engine are also disclosed.

6 Claims, 2 Drawing Sheets

(56) References Cited

U.S. PATENT DOCUMENTS

| | | | | |
|---|---|---|---|---|
| 10,808,575 | B2 * | 10/2020 | Taxacher | F01D 25/28 |
| 11,021,987 | B2 | 6/2021 | Clark et al. | |
| 2007/0098546 | A1 * | 5/2007 | Cairo | F01D 11/005 415/170.1 |
| 2012/0082540 | A1 | 4/2012 | Dziech et al. | |
| 2013/0108421 | A1 * | 5/2013 | Sinatra | C23C 28/3215 415/182.1 |
| 2014/0116059 | A1 * | 5/2014 | Benz | F23R 3/005 60/754 |
| 2016/0348528 | A1 * | 12/2016 | Vetters | F01D 11/08 |
| 2017/0022840 | A1 * | 1/2017 | Thomas | F02C 7/12 |
| 2017/0044920 | A1 * | 2/2017 | Vetters | F01D 9/02 |
| 2017/0260869 | A1 * | 9/2017 | Vetters | F01D 11/025 |
| 2017/0276000 | A1 * | 9/2017 | Snider | F01D 11/10 |
| 2018/0149030 | A1 | 5/2018 | Freeman et al. | |
| 2018/0306045 | A1 * | 10/2018 | Barrett | F01D 11/08 |
| 2018/0363483 | A1 * | 12/2018 | Hafner | F01D 9/04 |
| 2018/0363485 | A1 * | 12/2018 | Hafner | F01D 11/08 |
| 2019/0063249 | A1 * | 2/2019 | McCaffrey | F01D 25/28 |
| 2020/0131916 | A1 * | 4/2020 | Eastwood | F01D 5/3007 |
| 2021/0071584 | A1 | 3/2021 | Barker et al. | |
| 2021/0131299 | A1 * | 5/2021 | Lutjen | F01D 11/08 |

* cited by examiner

BLADE OUTER AIR SEAL WITH LARGE RADIUS OF CURVATURE MOUNT HOOKS

BACKGROUND OF THE INVENTION

This application relates to a blade outer air seal formed of ceramic matrix composites and having mount hooks formed with a curved inner mount surface with a large radius of curvature.

Gas turbine engines are known, and typically have a fan delivering air into a bypass duct as propulsion air. The fan also delivers air into a compressor where it is mixed with fuel and ignited. Products of the combustion pass downstream of the turbine rotors, driving them to rotate. The turbine rotors in turn rotate fan and compressor rotors.

As known, the products of combustion expose components in the turbine section to very high temperatures. As such, it becomes a challenge to develop components for the turbine section which can survive those temperatures.

One proposed solution to manufacturing components which can survive the high temperatures is the use of ceramic matrix composites ("CMCs"). While CMCs are able to withstand high temperatures, they do raise challenges. One particular challenge is that it is somewhat difficult to form a CMC component to complex shapes.

In a turbine section there are typically rows of rotating turbine blades having an outer tip. A blade outer air seal ("BOAS") is typically positioned outwardly of each row of the blades. It has been proposed to form the BOAS out of CMCs. However, it has proven challenging to form the required mount structure for mounting the BOAS in the turbine section when the BOAS is formed of CMCs.

Typically, mount hooks are formed on a BOAS to mount it to static structure in the turbine section. One type of mount arrangement has a pair of facing mount hooks on the BOAS supported on mating hooks on the static structure. Some prior art BOAS mount hooks have had an inner surface contacting the static mount structure formed generally along a curve over the bulk of a length of the mount hook. However, in the prior art, the mount hook has extended for a very small length, and a radius of curvature of the curve has been relatively small. Such a structure would be difficult to make.

It is also known in the prior art to have a mount hook with an inner support surface having larger radius of curvature curves at an initial point and at an end point with an intermediate section that is relatively flat, and thus has extremely large radius of curvature. It would be challenging to accurately manufacture such a shape.

SUMMARY OF THE INVENTION

In a featured embodiment, a blade outer air seal for use in a gas turbine engine includes a central web having a radially inner surface centered on an axis to be positioned outwardly of a rotating blade in a gas turbine engine. Seal mount hooks are on both a leading edge of the central web and a trailing edge of the central web. The seal mount hooks have a generally radially outward extending section extending to a generally axially extending section. The seal mount hooks have a support face which is to be supported on a support mount hook. The support face is generally formed about a single radius of curvature over at least 50% of a circumferential length defined from a radially inner end of the support face to a radially outer end of the support face. A radius of curvature of the inner support surface is greater than or equal to 0.150 inch and less than or equal to 0.300 inch.

In another embodiment according to the previous embodiment, the support face is formed on the single radius of curvature over at least 90% of the circumferential length between the radially inner and outer ends.

In another embodiment according to any of the previous embodiments, the support face is formed on the single radius of curvature over the entire circumferential length between the radially inner and radially outer ends.

In another embodiment according to any of the previous embodiments, the web has a radially outer surface which is formed to be generally flat compared to the support face.

In another embodiment according to any of the previous embodiments, the radially inner surface of the central web is curved about an axis of rotation of the gas turbine engine. A large radius is defined between the rotational axis and the radially inner surface. The large radius is greater than or equal to 6 inches and less than or equal to 8 inches.

In another embodiment according to any of the previous embodiments, the web has a radially outer surface which is formed to be generally flat compared to the support face.

In another embodiment according to any of the previous embodiments, the blade outer air seal is formed of ceramic matrix composites.

In another featured embodiment, a blade outer air seal includes a central web having a radially inner surface centered on an axis to be positioned outwardly of a rotating blade in a gas turbine engine. Seal mount hooks are formed on both a leading edge of the central web and a trailing edge of the central web. The seal mount hooks have a generally radially outward extending section extending to a generally axially extending section. The seal mount hooks have a support face which is to be supported on a support mount hook. The support face is generally formed about a single radius of curvature over at least 50% of a circumferential length defined from a radially inner end of the support face to a radially outer end of the support face. A radius of curvature of the inner support surface is greater than or equal to 0.150 inch and less than or equal to 0.300 inch. The support face is formed on the single radius of curvature over the entire circumferential length between the radially inner and radially outer ends. The web has a radially outer surface which is formed to be generally flat. The blade outer air seal is formed of ceramic matrix composites.

In another featured embodiment, a gas turbine engine includes a compressor section, a combustor, and a turbine section. The turbine section has a plurality of rows of rotating turbine blades rotating about an axis having a radially outer blade tip. A blade outer air seal is positioned radially outwardly of at least one of the rotating turbine blade rows. The blade outer air seal has a central web with a radially inner surface positioned outwardly of at least one of the rotating turbine blades with seal mount hooks formed on both a leading edge of the central web and a trailing edge of the central web. The seal mount hooks have a generally radially outward extending section extending to a generally axially extending section. The seal mount hooks have a support face which is to be supported on a support mount hook. The support face is generally formed about a single radius of curvature over at least 50% of a circumferential length defined from a radially inner end of the support face to a radially outer end of the support face. A radius of curvature of the inner support surface is greater than or equal to 0.150 inch and less than or equal to 0.300 inch.

In another embodiment according to any of the previous embodiments, the support face is formed on the single radius of curvature over at least 90% of the circumferential length between the radially inner and outer ends.

In another embodiment according to any of the previous embodiments, the support face is formed on the single radius of curvature over the entire circumferential length between the radially inner and radially outer ends.

In another embodiment according to any of the previous embodiments, the web has a radially outer surface which is formed to be generally flat compared to the support face.

In another embodiment according to any of the previous embodiments, there is support structure for the seal mount hooks to mount the blade outer air seal to static structure within the gas turbine engine. The support structure has support mount hooks with a curved surface in contact with the support face of the blade outer air seal mount hooks.

In another embodiment according to any of the previous embodiments, one of the seal mount hooks is formed at a leading edge of the blade outer air seal and a second of the seal mount hooks is formed at a trailing edge of the blade outer air seal. The leading edge seal mount hook has its axially extending portion facing the axially extending portion of the trailing edge seal mount hook.

In another embodiment according to any of the previous embodiments, the radially inner surface extends along a curve about the axis. The radially inner surface is spaced from the axis by a large radius, with the large radius being greater than or equal to 6 inches and less than or equal to 8 inches.

In another embodiment according to any of the previous embodiments, there is support structure for the seal mount hooks to mount the blade outer air seal to static structure within the gas turbine engine. The support structure has support mount hooks with a curved surface in contact with the support face of the blade outer air seal mount hooks. One of the seal mount hooks is formed at a leading edge of the blade outer air seal and a second of the seal mount hooks is formed at a trailing edge of the blade outer air seal. The leading edge seal mount hook has its axially extending portion facing the axially extending portion of the trailing edge seal mount hook.

In another embodiment according to any of the previous embodiments, a mount seal is positioned between the support mount hook and the blade outer air seal mount hook support surface.

In another embodiment according to any of the previous embodiments, the mount seal is received within a seal ditch in the support mount hook.

In another embodiment according to any of the previous embodiments, the mount seal is a rope seal.

In another embodiment according to any of the previous embodiments, the blade outer air seal is formed of ceramic matrix composites.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
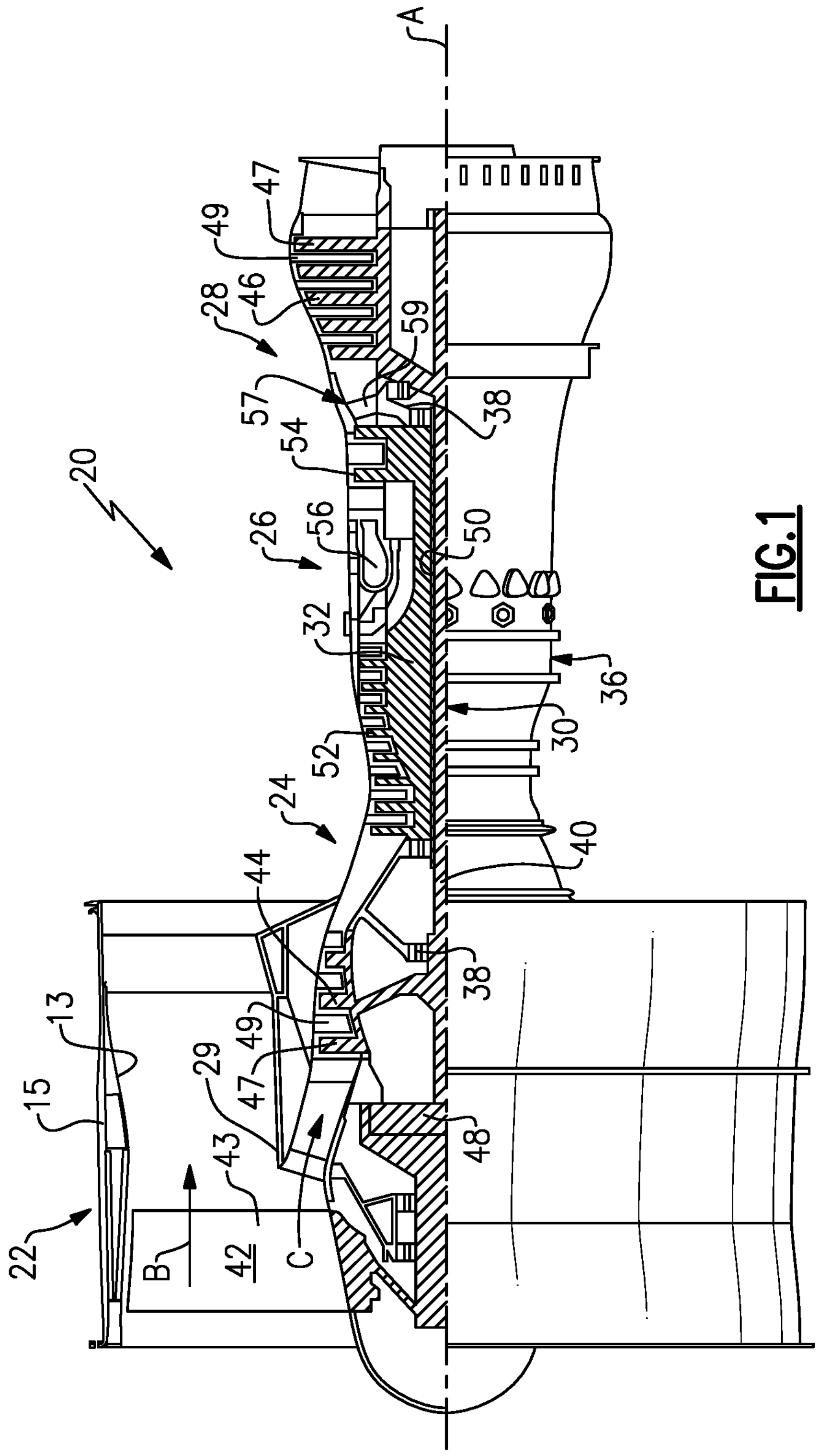
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
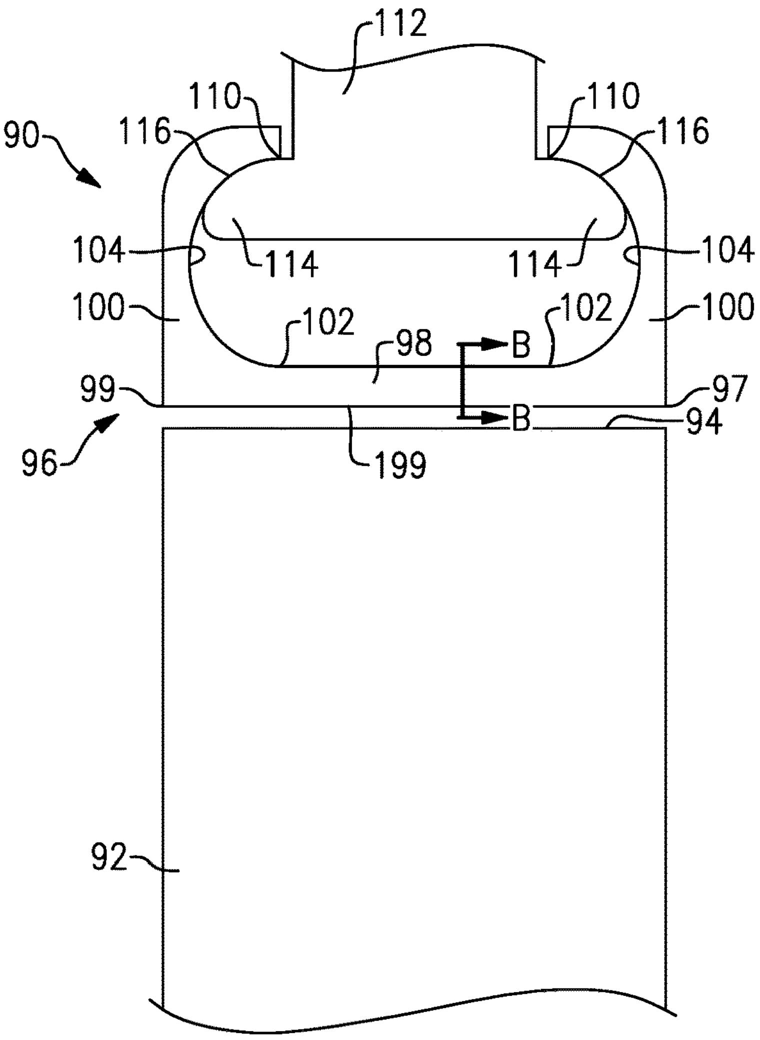
FIG. 2A shows a turbine section such as may be found in a gas turbine engine of FIG. 1.

FIG. 2A shows a turbine section 90 which may be incorporated into an engine such as the engine shown in FIG. 1. There are rows of rotating turbine blades 92 having a blade outer tip 94.

A BOAS 96 is positioned such that an inner surface 199 of a web 98 is closely positioned outwardly of the outer tip 94. As known the inner surface 199 is centered to be circular about a rotational axis of the engine. The BOAS limits leakage of the products of combustion around the blade 92 such that the efficiency of the engine is improved. BOAS mount hooks 100 on the blade outer air seal include one at an upstream or leading edge 99 and a second at a downstream or trailing edge 97. The BOAS mount hooks 100 face each other. The BOAS mount hooks 100 have an inner support surface 104 extending from a radially inner point 102 that connects into the web 98, and extends to a radially outward point 110.

A static support structure 112 receives and supports the BOAS mount hooks 100. The static support structure 112 has support mount hooks 114 supporting each of the hooks 100.

As is clear from the Figure, the inner surface 104 of the mount hooks 100 is supported on an outer curved surface 116 of the support mount hooks 114, but only over a portion of the extent of the inner surface 104 of the BOAS mount hooks 100. The curved surface 116 of the support mount hooks 114 might generally match the curve of the inner surface 104 of the BOAS mount hooks 100. On the other hand, the surfaces need not match at all and there might simply be point contact.

The surface 104 is generally circular over the entire distance between ends 102 and 110. In embodiments it is circular over at least 90% of a circumference measured between the points 102 and 110. In alternative embodiments it is circular over at least 50% of a circumference between points 102 and 110. That is, there may be small, local deviations from the single circular surface, however, the bulk of the circumference of the inner surface 104 is formed of a single circular shape. While the support surfaces 104 are shown to be curved, an outer surface of the mount hooks 100 extends generally radially, and there being a sharp corner at the leading 99 and trailing edge 97.

Figure 2B:
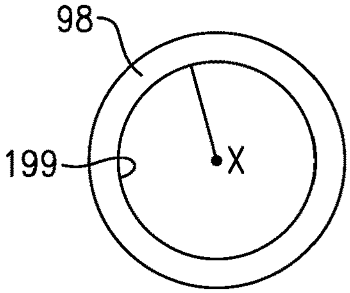
FIG. 2B is a cross-sectional view along line B-B of FIG. 2A.

FIG. 2B shows a feature of the blade outer air seals 98. It should be understood there are a plurality of circumferentially spaced blade outer air seals defining the inner surface 199. In FIG. 2B it is illustrated as a monolithic part, but again, in practice there may be a plurality of blade outer air seals. Inner surface 199 is spaced about a rotational axis X of the turbine blades 92. In embodiments consistent with the rest of this disclosure, the radius between X and 199 might be greater than or equal to 6 inches and less than or equal to 8 inches.

Figure 3:
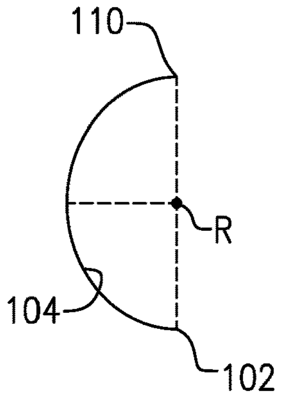
FIG. 3 shows a detail of the blade outer air seal of FIG. 2A.

FIG. 3 shows the inner surface 104 between the ends 102 and 110. A radius of curvature is defined from a point R to the inner surface 104. In the prior art BOAS having a mount hook formed as a single curve, the radius of curvature has been quite small.

In this disclosure, the radius of curvature is relatively large such that a "length" or circumferential extent of the inner surface 104 is much greater than in the proposed prior art.

According to this disclosure, the radius of curvature is greater than or equal to 0.150 inch and less than or equal to 0.300 inch. Such a large radius of curvature will be easier to manufacture from ceramic matrix composite materials ("CMCs"). This radius of curvature of the inner surface 104 would be that found in an engine having a large radius such as described in FIG. 2B.

CMCs according to this disclosure could be formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

Figure 4:
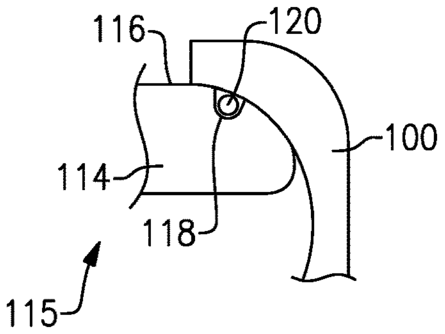
FIG. 4 shows an alternative embodiment of the blade outer air seal.

FIG. 4 shows an alternative embodiment 115 wherein a seal ditch 118 is formed into the support mount hook 114 and receives a mount seal 120. This is shown at the downstream hook 114. The mount seal 120 may be a rope seal. The prior art has generally not included a seal at such a location, however, when CMC materials are used to form the BOAS it is somewhat difficult to ensure tight manufacturing tolerances, and leakage can be an issue.

A blade outer air seal for use in a gas turbine engine under this disclosure could be said to include a central web having a radially inner surface centered on an axis to be positioned outwardly of a rotating blade in a gas turbine engine. Seal mount hooks are on both a leading edge of the central web and a trailing edge of the central web. The seal mount hooks have a generally radially outward extending section extending to a generally axially extending section. The mount hooks have a support face which is to be supported on a support mount hook. The support face is generally formed about a single radius of curvature over at least 50% of a circumferential length defined from a radially inner end of the support face to a radially outer end of the support face. A radius of curvature of the inner support surface is greater than or equal to 0.150 inch and less than or equal to 0.300 inch.

A gas turbine engine under this disclosure could be said to include a compressor section, a combustor, and a turbine section. The turbine section has a plurality of rows of rotating turbine blades rotating about an axis having a radially outer blade tip. A blade outer air seal is positioned radially outwardly of at least one of the rotating turbine blade rows. The blade outer air seal has a central web with a radially inner surface positioned outwardly of at least one of the rotating turbine blades with seal mount hooks formed on both a leading edge of the central web and a trailing edge of the central web. The seal mount hooks have a generally radially outward extending section extending to a generally axially extending section. The seal mount hooks have a support face which is to be supported on a support mount hook. The support face is generally formed about a single radius of curvature over at least 50% of a circumferential length defined from a radially inner end of the support face to a radially outer end of the support face. A radius of curvature of the inner support surface is greater than or equal to 0.150 inch and less than or equal to 0.300 inch.

Although embodiments of this disclosure have been shown, a worker of ordinary skill in this art would recognize that certain modifications would come within the scope of this disclosure. For that reason, the following claims should be studied to determine the true scope and content of this disclosure.

What is claimed is:

1. A gas turbine engine comprising:

a compressor section, a combustor, and a turbine section, said turbine section having a plurality of rows of rotating turbine blades rotating about an axis having a radially outer blade tip, and a blade outer air seal positioned radially outwardly of at least one of said rotating turbine blade rows;

said blade outer air seal having a central web with a cylindrical radially inner surface positioned outwardly of at least one of the rotating turbine blades with seal mount hooks formed on both a leading edge of said central web and a trailing edge of said central web, said seal mount hooks having a generally radially outward extending section extending to a generally axially extending section, said generally axially extending section of said leading edge seal mount hook facing said generally axially extending section of said trailing edge seal mount hook, and with the leading and trailing edges being defined relative to the axis, and the cylindrical radially inner surface centered on the axis;

said seal mount hooks having a support face which is to be supported on a support mount hook, and the support face being generally formed about a single radius of curvature over at least 50% of a circumferential length defined from a radially inner end of said support face to a radially outer end of said support face, and a radius of curvature of said support face being greater than or equal to 0.150 inch and less than or equal to 0.300 inch, the leading and trailing edge mount hooks having an outer surface facing away from each other, and having a sharp corner at the leading edge and trailing edge of the outer surface;

wherein there is support structure for the seal mount hooks to mount the blade outer air seal to static structure within the gas turbine engine, the support structure having support mount hooks with a curved surface in contact with said support face of said blade outer air seal mount hooks, wherein one of said seal mount hooks is formed at a leading edge of the blade outer air seal and a second of said seal mount hooks is formed at a trailing edge of said blade outer air seal, and said leading edge seal mount hook having its axially extending portion facing the axially extending portion of the trailing edge seal mount hook;

wherein a mount seal is positioned between said support mount hook and said blade outer air seal mount hook support face;

wherein said mount seal is received within a seal ditch in the support mount hook, and the mount seal and seal ditch are on a radially outer face of the support mount hook, and the mount seal contacts a radially inner face of the blade outer air seal mount hook support face; and wherein said blade outer air seal is formed of ceramic matrix composites.

2. The gas turbine engine as set forth in claim 1, wherein said support face is formed on the single radius of curvature over at least 90% of the circumferential length between the radially inner and outer ends.

3. The gas turbine engine as set forth in claim 2, wherein the support face is formed on the single radius of curvature over the entire circumferential length between the radially inner and radially outer ends.

4. The gas turbine engine as set forth in claim 2, wherein the central web has a radially outer surface which is formed to be generally flat compared to the support face.

5. The gas turbine engine as set forth in claim 1, wherein the radially inner surface extends along a curve about the axis, and the radially inner surface being spaced from the axis by a large radius, with the large radius being greater than or equal to 6 inches and less than or equal to 8 inches.

6. The gas turbine engine as set forth in claim 1, wherein the mount seal is a rope seal.

* * * * *